United States Patent [19]
Reinheimer et al.

[11] Patent Number: 4,733,954
[45] Date of Patent: Mar. 29, 1988

[54] MICROSCOPE SUPPORT

[75] Inventors: Guenter Reinheimer, Biebertal; Karl Wieber, Asslar-Berghausen; Robert Lisfeld, Ulm-Allendorf; Walter Voigt, Linden, all of Fed. Rep. of Germany

[73] Assignee: Ernst Leitz Wetzlar GmbH, Wetzlar, Fed. Rep. of Germany

[21] Appl. No.: 869,692

[22] Filed: Jun. 2, 1986

[30] Foreign Application Priority Data

Jun. 7, 1985 [DE] Fed. Rep. of Germany ....... 3520475

[51] Int. Cl.$^4$ ...................... G02B 21/06; G02B 21/24; G02B 21/28
[52] U.S. Cl. ...................................... 350/523; 350/588
[58] Field of Search ................ 350/507, 253, 523–528, 350/533, 588; 362/362, 373; 353/102

[56] References Cited

U.S. PATENT DOCUMENTS

| | | | |
|---|---|---|---|
| 2,376,710 | 5/1945 | Maurer | 350/253 |
| 2,471,879 | 5/1949 | Lowber et al. | 350/527 |
| 3,126,785 | 3/1964 | Zillmer | 362/362 |
| 3,971,622 | 7/1976 | Yoshinaga | 350/528 |
| 4,210,384 | 7/1980 | Meyer et al. | 350/523 |
| 4,284,327 | 8/1981 | Kraft et al. | 350/526 |
| 4,546,420 | 10/1985 | Wheeler et al. | 362/373 |

FOREIGN PATENT DOCUMENTS

| | | | |
|---|---|---|---|
| 217327 | 1/1985 | German Democratic Rep. | 350/523 |

OTHER PUBLICATIONS

Hohn, E., "The Leitz Metalloplan HL 6×6 in", *Leitz Sci. & Tech. Inf.*, (Germany), vol. 7, #6, 6-1979, pp. 174-177.

Baensch, R., "The Leitz Laborlux 11 & Leitz Laborlux 12", Leitz Sci. & Tech. Inf., (Germany), vol.7, #6, 6-1979, pp. 178-182.

Gause et al., "New Polarizing Microscopes Amplival Pol-D & Amplival Pol-V", Jena Review, Spring 1968, pp. 60-64.

*Primary Examiner*—William H. Punter
*Attorney, Agent, or Firm*—Schwartz, Jeffery, Schwaab, Mack, Blumenthal & Evans

[57] ABSTRACT

A microscope support foot (10) includes a central portion (14) and two lateral portions (15, 16), which form receiving chambers (19, 20, 21) by means of separating walls (17, 18) extending as far as a base plate (23). The optical components for an illumination arrangement (28) are disposed in receiving chamber (20) so as to be protected from dust by a seal (25), and the electronic components are disposed in a heat-dissipating manner in the receiving chamber (21), so that the heat-emitting components are in contact with the base plate (23) which is made of heat-dissipating material. This base plate and the lateral portion (16) have ventilation slits (42, 42'). A drive unit (36) for the adjustment of the successviely arranged aperture stop and light field stop (30, 31) is secured in the receiving chamber (19) in such a manner that the adjusting arrangement is accessible from outside and is disposed at a convenient distance from a focussing arrangement (13).

5 Claims, 2 Drawing Figures

MICROSCOPE SUPPORT

BACKGROUND OF THE INVENTION

The present invention relates to a microscope support foot for receiving optical and electronic components of an illumination arrangement as well as a drive unit for the optical components. The support foot has a central portion, respective lateral portions integral therewith, carrying a hand rest, and a base plate covering the microscope support foot.

German Offenlegungsschrift No. 2,451,884 discloses a microscope support, in the foot of which a dish-shaped carrier is securable to receive electrical components which serve for controlling the illumination. In the interior of the foot, an optical system is additionally arranged, which directs a beam of light through a projection lens to a converging lens. Only the carrier is to be handled for the assembly and the maintenance of the electrical components. No information on the arrangement of the optical system and the functions thereof can be inferred from this publication.

In another known microscope support, optical and electrical components of the illumination arrangement are disposed in the foot. the foot has a central portion and two lateral portions, and is covered by a base plate. The lateral portions carry hand rests and permit an ergonomic posture of the arm during use of the microscope. Optical components are mounted in the central portion of the foot as part of an illumination arrangement, namely an illumination lens, a deflecting mirror and a variable light field stop. The aperture of the latter is adjustable by means of a knurled wheel secured in the support foot. In this microscope, a similarly variable aperture stop is a component of the converging lens and is operated by means of an adjusting wheel or lever disposed on this lens arrangement.

Not least because of the construction of its foot which is provided with stiffening ribs in the interior, such a microscope support exhibits a high mechanical stability, but is not free from disadvantages. In view of the increased requirements regarding the power of the illumination arrangement, it is indeed possible to replace the conventional electrical components, such as transformers, by electronic switching components (transistors etc.) with lower heat losses. However, especially in long-term operation of a microscope, the heat loss invariably leads to interfering alterations in focus. A support foot construction promoting the circulation of air gives rise to increased formation of dust and requires frequent cleaning of the optical components of the illumination arrangement, which likewise interferes with long-term operation. Moreover, as a result of the position of the light field stop in the microscope support foot and the position of the aperture stop in the converging lens, joint operation of these stops by means of the drive means associated with them is not possible.

SUMMARY OF THE INVENTION

It is therefore an object of the present invention to provide an improved microscope support.

It is a particular object of the invention to provide a microscope support foot which overcomes the above-mentioned disadvantages.

Another object of the invention resides in providing a microscope support foot characterized by easier handling of the adjustable optical components, and wherein long-term operation of the microscope is disturbed to the smallest possible extent by contamination of such components or because of changes in focus due to thermal expansion.

In accomplishing the foregoing objects, there has been provided in accordance with the present invention a microscope support, comprising: a base having a central portion and respective side portions integral with the central portion; a base plate covering the bottom of the base; an upright member for supporting a microscope, extending upwardly from the central portion of the base; means, mounted on the upright, for focussing the microscope; partition means, within the base and cooperating with the base plate, for defining a central receiving chamber in the central portion and side receiving chambers in each of the side portions of the base; elements of an optical illuminating system disposed within the central receiving chamber; electrical and electronic components of the illuminating system disposed in a first of the side receiving chambers; means, associated with the first side receiving chamber, for dissipating heat generated by said electronic components; and an adjustment mechanism for the optical illuminating system mounted on one of the side portions at a finger access distance from the focussing means.

Further details, features and advantages of the invention will become evident from the detailed description of preferred embodiments, which follows, when considered with the attached drawing.

DETAILED DESCRIPTION OF THE PREFERRED EMBODIMENTS

Figure 1:
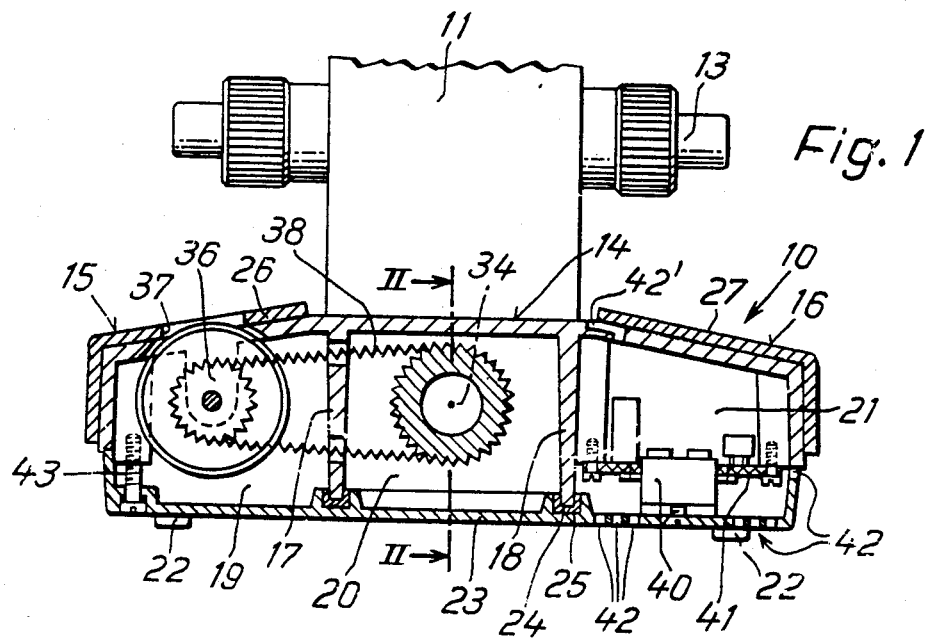
FIG. 1 is a diagrammatic front cross-sectional view of the microscope support foot according to the invention.
Figure 2:
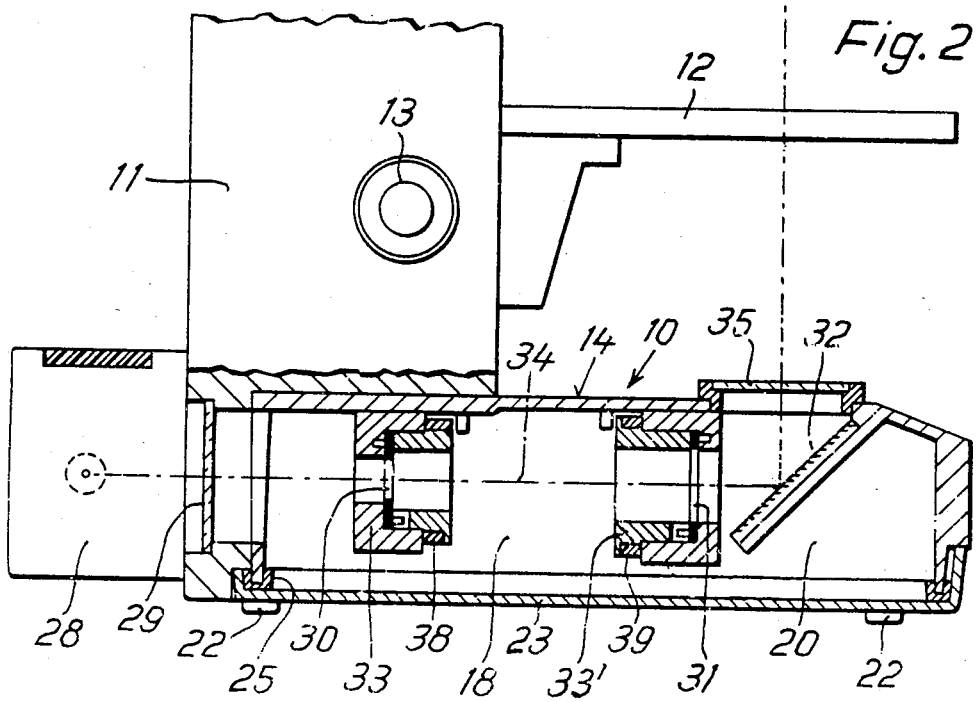
FIG. 2 is a partial cross-sectional side view of the central portion of the support foot according to the invention, along the line II—II or FIG. 1.

The microscope support foot 10 shown in FIG. 1 is a component of a right-angle support, of which only a vertical upright 11 is shown here, with an object stage 12, shown in FIG. 2 which is vertically displaceable by means of a focussing arrangement 13. Integral with the upright 11 is a central portion 14 of the support foot 10, with which lateral foot portions 15, 16, which are likewise integral therewith, connect. These are separated from the central portion 14 by separating walls 17, 18, whereby individual receiving chambers 19, 20, 21 are formed within the foot. The support foot 10 is covered by a base plate 23, which is provided with feet 22 and with a molded groove 24 to receive a thermally insulating seal 25, for example of foam rubber. On securing the base plate 23 to the support foot 10 by means of screws 43, the separating walls 17, 18, which extend as far as the base plate 23, engage in the appropriately disposed grooves 24 of the base plate 23 and form, by means of the seals 25, a dust-tight sealing-off of the central portion 14 from the lateral portions 15, 16. The latter are provided with cushioned hand rests 26, 27.

An illumination lens 29, an aperture stop 30, and light field stop 31 and a deflecting mirror 32 are disposed in succession in the central portion 14 of the support foot 10 as optical components of an attachable illumination arrangement 28 (FIG. 2). The aperture stop 30 and the light field stop 31 are inserted in each instance into stop supports 33 and 33', which are displaceable transversely to the optical axis 34 of the illumination arrangement 28.

A planoconvex lens 35 is mounted above the deflecting mirror 32 as a cover.

A drive unit 36 in the form of two knurled wheels is secured in the receiving chamber 19 of the lateral portion 15. With these the aperture of the stops 30, 31 is controllable. Thus, the arrangement of the drive unit 36 is such that the knurled wheels project slightly from a sealed gap 37 of the hand rest 26 and are situated at a convenient finger access distance from the focussing arrangement 13. Respective toothed belts 38, 39 are provided as drive means, one each for the stops 30, 31.

The receiving chamber 21 of the lateral portion 16 contains the electronic and electrical components in the form of a circuit switching element 40 for the illumination arrangement 28. In order to facilitate maintenance and possibly exchange, the circuit switching element 40 is mounted on a carrier 41 in such a manner that all heat-dissipating components (such as for example transistors) are in contact with the base plate 23. The latter is preferably made of a material having good thermal conductivity and provided with ventilation slits 42. Further ventilation slits 42' are provided in the upper part of the receiving chamber 21 and are designed in such a manner that, by partial covering by means of the hand rest 27, protection of the circuit switching element 40 against penetration by foreign particles is provided.

We claim:

1. A microscope support, comprising:
    a base having a central portion and respective side portions integral with the central portion;
    a base plate covering the bottom of said base;
    an upright member for supporting a microscope, extending upwardly from the central portion of the base;
    means, mounted on the upright, for focussing the microscope;
    partition means, within the base and cooperating with said base plate, for defining a central receiving chamber in the central portion and side receiving chambers in each of the side portions of the base, said partition means comprising separating walls and a thermally insulating seal disposed between the separating walls and the base plate;
    elements of an optical illuminating system disposed within the central receiving chamber;
    electrical and electronic components of the illuminating system disposed in a first of the side receiving chambers;
    means, associated with said first side receiving chamber, for conducting heat generated by said electronic components away from said components, said heat conducting means being in direct contact with said components; and
    an adjustment mechanism for said optical illuminating system mounted on one of said side portions at a finger access distance from said focussing means.

2. A microscope support as claimed in claim 1, wherein said heat conducting means includes a carrier on which the electrical components are secured, said carrier being within said first receiving chamber and in contact with the base plate.

3. A microscope support as claimed in claim 1, wherein the base plate further comprises a plurality of feet and ventilation slits, and wherein the side portion including said first receiving chamber includes at least one ventilation slit in its upper wall.

4. A microscope support as claimed in claim 1, wherein said illumination system includes an aperture stop and a light field stop, and wherein said adjustment mechanism includes first and second knurled knobs and first and second toothed belts associated therewith.

5. A microscope support as claimed in claim 1, wherein said base plate comprises a material having good thermal conductivity and said heat conducting means conducts heat from said electrical components to said base plate.

* * * * *